(12) United States Patent
Alonso et al.

(10) Patent No.: US 12,493,850 B2
(45) Date of Patent: Dec. 9, 2025

(54) DEVICE, METHOD AND SYSTEM FOR THE RECORDING OF PARAMETERS DURING THE TRANSPORT OF GOODS

(71) Applicant: ARCTIC SEA, S.L., Mungia (ES)

(72) Inventors: Iñigo Alonso, Mungia (ES); Pablo Múgica, Mungia (ES)

(73) Assignee: ARCTIC SEA, S.L., Mungia (ES)

( * ) Notice: Subject to any disclaimer, the term of this patent is extended or adjusted under 35 U.S.C. 154(b) by 482 days.

(21) Appl. No.: 17/294,881

(22) PCT Filed: Nov. 21, 2018

(86) PCT No.: PCT/ES2018/070752
§ 371 (c)(1),
(2) Date: May 18, 2021

(87) PCT Pub. No.: WO2020/104709
PCT Pub. Date: May 28, 2020

(65) Prior Publication Data
US 2022/0004988 A1    Jan. 6, 2022

(51) Int. Cl.
*G06Q 10/083*    (2024.01)
*G06Q 10/0832*   (2023.01)
(Continued)

(52) U.S. Cl.
CPC ... *G06Q 10/08355* (2013.01); *G06Q 10/0832* (2013.01); *G06Q 10/0833* (2013.01); *G07C 9/00896* (2013.01); *G07C 2009/0092* (2013.01)

(58) Field of Classification Search
CPC ............. G06Q 10/083; G06Q 10/0832; G06Q 10/0833; G06Q 10/0835; G06Q 10/0837; G06Q 10/0838
See application file for complete search history.

(56) References Cited

U.S. PATENT DOCUMENTS

| | | | |
|---|---|---|---|
| 9,760,854 B1* | 9/2017 | Chowdhary | G06Q 10/0837 |
| 2005/0055287 A1* | 3/2005 | Schmidtberg | G06Q 10/063 705/28 |

(Continued)

FOREIGN PATENT DOCUMENTS

| | | |
|---|---|---|
| CN | 206542452 U | 10/2017 |
| EP | 3299782 A1 | 3/2018 |

OTHER PUBLICATIONS

Kim, Taebok, and Christoph H. Glock. "On the use of RFID in the management of reusable containers in closed-loop supply chains under stochastic container return quantities." Transportation Research Part E: Logistics and Transportation Review 64 (2014): 12-27. (Year: 2014).*
Database WPI, Week 201772, Thomson Scientific, AN 2017-702670, XP002790501, pp. 1.
International Search Report issued Apr. 24, 2019 re: Application No. PCT/ES2018/070752, pp. 1-4, citing: US 2018/0322454 A1, US 2016/0063433 A1, M. Teucke et al. "Sharing Sensor . . . ", US 2011/0077909 A1, US 2018/0144298 A1, Database WPI Week 201772.

(Continued)

*Primary Examiner* — Emmett K. Walsh
(74) *Attorney, Agent, or Firm* — CANTOR COLBURN LLP (57) ABSTRACT

A device, method and system for recording at least associated with the transport of products in a container. The device includes at least one sensor to measure the at least one parameter, a positioning component for determining a location of the device, a data storage component to store data measured by the sensor, the data being associated to the location of the device at the moment in which a particular data is measured and input/output element to transmit the data stored in the data storage component. The device also includes a processing component to, for each transport stage followed by the device, associate a use code to data stored in the data storage component during the time the transport stage lasts, the use code being associated to a particular (Continued)

transport stage, wherein each use code associated to each transport stage is different from use codes associated to other transport stages.

14 Claims, 3 Drawing Sheets

(51) Int. Cl.
 *G06Q 10/0833* (2023.01)
 *G06Q 10/0835* (2023.01)
 *G07C 9/00* (2020.01)

(56) References Cited

U.S. PATENT DOCUMENTS

| | | | | |
|---|---|---|---|---|
| 2011/0074587 | A1* | 3/2011 | Hamm | G06Q 10/08 340/673 |
| 2011/0077909 | A1 | 3/2011 | Gregory et al. | |
| 2016/0063433 | A1 | 3/2016 | Glasgow et al. | |
| 2017/0083861 | A1* | 3/2017 | Aryeetey | G06Q 10/0833 |
| 2018/0144298 | A1 | 5/2018 | Rankin | |
| 2018/0165631 | A1* | 6/2018 | Romero | G08B 13/19665 |
| 2018/0322454 | A1 | 11/2018 | Komoni | |

OTHER PUBLICATIONS

M. Teucke et al., "Sharing Sensor Based Quality Data in Automotive Supply Chain Processes", ScienceDirect, IFAC-PAPERSONLINE-8TH IGAC Symposium on Advances in Automotive Control AAC, 2018, vol. 51, No. 11, pp. 770-775.

Written Opinion issued Apr. 24, 2019 re: Application No. PCT/ES2018/070752, pp. 1-7, citing: US 2018/0322454 A1, US 2016/0063433 A1, M. Teucke et al. "Sharing Sensor . . . ", US 2011/0077909 A1, US 2018/0144298 A1, Database WPI Week 201772.

* cited by examiner

DEVICE, METHOD AND SYSTEM FOR THE RECORDING OF PARAMETERS DURING THE TRANSPORT OF GOODS

TECHNICAL FIELD

The present disclosure belongs to the sector of transport of goods and raw materials; and more specifically to the control of temperature and other parameters in the interior of containers used for said transport.

BACKGROUND

In the sector of transport of goods and raw materials, the products are normally transported in chambers, also referred to as containers or boxes, which may require specific environmental conditions during the time the shipping lasts. For example, the transported goods may need particular temperature, humidity or light conditions inside the containers. The exporter usually introduces equipment (also referred to as recorders or recording devices) to ensure that these specific environmental conditions are met. These recording devices measure and record temperature and other parameters, and the importer receives the recording devices when opening the container or cargo. At present, there exist a large number of recording devices of various parameters, such as temperature, relative humidity and/or other parameters. These recording devices are normally composed of electronic elements that record and store the data, for example temperature data, and communication systems to transmit the gathered data to another medium such as a PC, laptop, mobile telephone, etc.

Certain recording devices and related systems enable the data gathered and stored in the recording device to be sent to the cloud, where data is associated with an identifier of the device for later consultation or data processing by authorized persons. For example, European patent application EP3299782A1 discloses a system for recording and managing parameters associated with the transport of perishable products in a refrigeration container. In the disclosed system, a recording device is housed in the interior of a refrigeration container. The recording device comprises: one or more sensors for measuring corresponding parameters at repeated instances during transportation, electronic storage means for storing data captured by the sensors and input/output means. The system works as follows: when the container, including the recording device, arrives at its destination, an operator collects the recording device and transfers the stored data from the recording device to an electronic device. In turn, the data is also sent to the cloud where it is stored, managed and made available to authorized persons, for example importers, exporters or any person involved in the transportation and delivery of the products.

Currently, the vast majority of these recording devices, which are usually simple and low-cost, either analog or digital, are discarded after a single use between exporter and importer, despite having a battery and working perfectly, because of the logistical difficulty of re-use. Usually, the receiver of the monitoring devices does not need to monitor temperature or other parameters in future trips, thus has no interest in keeping and re-using the device. Then, the only possibility for the receiver would be shipping the devices back to the sender, but this implies logistic costs. A last option would be developing a pooling system by the manufacturer of the devices or a third party, but re-usable devices store data that can be considered sensitive by some users and until now, this confidentiality issue has not been solved. This is a serious environmental problem, as millions of components and batteries are not even recycled, but simply thrown into a wastebasket of many offices on a regular basis.

At present, and with the rise of data transmission systems, recording devices are capable of continuously transmitting data, such as temperature data. In this text, the term continuously should be interpreted as at periodic or non-periodic time intervals, such as every several minutes, hours or days. A skilled reader will understand that the degree of continuity will depend, among others, on the technology employed and on the limitations of the transmitting and receiving equipment, such as capacity, coverage or others. This continuous transmission of recorded data may be done, for example, through GPRS, UMTS or any other available wireless communications systems suitable for Narrowband-IOT (NB-IoT) devices, together with geographical positioning systems providing the geographical position of the recording devices, for example captured by signal triangulation or GPS modules embedded in the recording devices. Thus, the recording devices send the sensed data and associated geographical position, which are also recorded in an internal memory, to the cloud, together with an identifier of the device to which the data are associated.

These devices aggravate the aforementioned one-time use problem because the functionality of continuous sending to the cloud of captured data generates valuable added information that users are not willing to share. In addition to data on environmental variables (temperature, relative humidity, light, etc.), these devices store and send information about the route that have been followed at any given time, which implies that they store and send confidential information about an importer or buyer (such as origin and route of a container from its departure) and sales (such as arrival at destination at the importers premises).

Therefore, there is a need to preserve confidentiality of the data recorded and transmitted to the cloud, without which exporters and importers will not decide to reuse the recording devices.

SUMMARY

The present disclosure aims to solve the previous drawbacks by means of a device, method and system for sensing, recording and transmitting at least one parameter associated to the transport of goods in containers. The at least one parameter, such as a parameter of the cold chain for refrigerated products, mat be the temperature in the interior of the container. Optionally other parameters may be sensed, recorded and transmitted.

In order to protect the confidentiality of data and therefore, allow reuse of a given device in order to reduce the environmental impact of single-use equipment, the device of the present disclosure uses a code (use code or transit code) associated to a particular transport or shipping stage of the container, so that the data collected by the device during said transport stage is associated with that use code, and not with the identifier of the device itself. In this way, only an authorized user, who knows a particular use code, is able to access the information retrieved from the cloud through the use code. In other words, the information gathered during a specific transport stage is only available for authorized persons who have access to the use code associated to that transport stage. Therefore, each user is not able to access the information associated to other use codes of the same device. The identifier of the device keeps on performing its task of, for example, identifying location, billing uses, battery management, etc., but is not linked to the information captured by the recording device and associated positioning data.

In a first aspect of the disclosure, a device for sensing and recording data associated to at least one parameter associated with the transport of products in a container is disclosed. The device, that is to be housed inside a container, comprises at least one sensor to measure the at least one parameter, positioning means for determining the location of the device, e.g. a GPS module or a signal triangulation system, and data storage means to store data measured and gathered by the at least one sensor. Each particular data measured by the at least one sensor may be associated to a corresponding current location information gathered by the positioning means at the moment in which said particular data is measured. The device further comprises input/output means to transmit the data stored in the data storage means and processing means to, for each transport stage followed by the device, associate a use code to data stored in the data storage means during the time said transport stage lasts, said use code being associated to a particular transport stage, wherein each use code associated to each transport stage is different from use codes associated to other transport stages. Each use code is therefore linked to each particular transport stage. The data associated to a use code is accessible for a particular user, this user having this use code, when said use code is provided by the user as an access code. This use code, that is a single-use code, may be selected from a group comprising a random use code, a pseudo-random use code or a user-generated use code.

As used herein, a transport stage refers to the period of time between the activation of the device and its subsequent deactivation, substantially corresponding to the period of time between the departure of the container from the departing location and the arrival of the container at its respective delivery location. In some examples, the delivery location may be the final delivery location or some intermediate location in the path towards its final delivery location.

In some examples, the device comprises means for generating a different use code every time the device is activated, for example the device may integrate a Pseudo-Random Number Generator (PRNG) or a True Random Number Generator (TRNG) to generate a pseudo-random use code or a random use code, respectively. In this way, a different use code is generated when the device is activated and said different use code is unequivocally linked to a particular transport stage.

In some examples, the device comprises means to enable the introduction of a user-generated use code, that for example might be selected from a list of available use codes, that is to be associated to a particular transport stage. These means can be one or a combination of elements such as a screen, start/stop buttons, tactile screen, keyboard, or even a web or mobile application through which the user-generated use codes can be transmitted to the devices.

In some examples, the input/output means are configured to send the use code to the cloud from where the user, for example at the delivery location, may retrieve it. Some examples of input/output means that the device may implement are GPRS, 2G, 4G, 5G, LTE, CatM, NB-IoT, Sigfox, Lora communication subsystems or any combination thereof, to allow a remote connection to the cloud. Other communication subsystems may be also implemented in the device. In some other examples, the device comprises means for receiving, via the input/output means, the use code, for example, from the cloud. The device when activated may send an alert to the cloud that may cause the cloud to generate the use code. In such examples, the cloud, e.g., a cloud server, may incorporate means for generating a use code, such as a PRNG or a TRNG for generating a pseudo-random or a random use code, respectively. The communication between the cloud and the device may be carried out using GPRS, 2G, 4G, 5G, LTE, CatM, NB-IoT, Sigfox, Lora communication subsystems, any combination thereof or any other communication subsystem to allow remote connection to the cloud.

Alternatively, once the device is active, the use code may be remotely or locally sent, via the input/output means, to the device. This use code may be previously generated by a user in an external device having communication subsystems to remotely or locally communicate to the input/output means of the device.

In some examples, the device has associated thereto an identifier for unequivocally identifying the device, said identifier being different from the use code. The identifier may be used for invoicing purposes or battery management, among others.

In some examples, the at least one sensor is selected from a group comprising: a temperature sensor, a light sensor, a humidity sensor, an accelerometer, a gas sensor and any combination thereof.

In some examples, the input/output means are configured to transmit the data associated to the use code to the cloud via a remote connection, e.g., to a cloud server or to a remote server via GPRS, 2G, 4G, 5G, LTE, CatM, NB-IoT, Sigfox, Lora communication subsystems or any other remote communication subsystem.

In some examples, the input/output means are configured to transmit the data associated to the use code to an external device via a local connection, e.g., to a PC, smartphone or PDA via a Wi-Fi, USB, micro USB, NFC, RFID, Bluetooth or any other local communication subsystem. These local communication subsystems are especially useful when the remote communication systems or the network for remote communications is not available or when a firmware update is required. In some other examples, the input/output means may incorporate a local and a remote communication system to be able to locally and/or remotely transmit said data.

In another aspect of the disclosure, a system for recording and managing at least one parameter associated with the transport of products in a container is disclosed. The system comprises at least one device as previously described. This at least one device, once it is activated, is housed inside the container. The device is to associate a particular use code to the data gathered by the at least one sensor and the positioning means during the time a particular transport stage of the container lasts. The system further comprises a cloud server to receive from the device the data associated to the particular use code and to store said associated data.

The system also comprises at least one electronic device, for example a laptop, smartphone or PDA, configured to enroll as an authorized user for accessing data associated to the particular use code. This enrolling operation may be performed in at least one of the at least one device and the cloud server. In order to be granted as an authorized user, the particular use code is provided by the user as a valid access code to the respective at least one device and the cloud server. In some examples, the cloud sever and the device may incorporate respective access control systems to grant access to the data stored when the corresponding use code is provided as a valid access code. Thus, a user managing said electronic device and knowing the use code associated to the requested data may retrieve said data from the device or from the cloud server by providing said use code as a valid access code.

In some examples, the at least one electronic device is configured to receive the data and use code delivered by the input/output means of the at least one device by means of a local connection established between the electronic device and the input/output port of the device, said local connection being a wireless connection, such as Bluetooth, Wi-Fi or RFID, or a wired connection, such as USB, mini USB or micro USB, etc. This local connection may be especially useful if a failure in the network or the remote connection happens and for firmware updating purposes.

In some examples, the reception of data in said at least one electronic device is carried out after executing a computer application in said at least one electronic device.

In some examples, the device provides the data associated to the use code by way of a web page or a computer application downloaded in at least one electronic device of said user having an internet connection.

In another aspect of the disclosure, a computer-implemented method for sensing and recording data associated to at least one parameter associated with the transport of products in a container is described. Once at least one device as previously described is housed in a container and during the time said transport lasts, the method comprises measuring, by the at least one sensor, a particular parameter at repeated instances during the transport of the container. It further comprises determining, by the positioning means, a location of the device at the repeated instances and associating the measured data to the corresponding locations and to a particular use code. Then, this associated data is stored in the data storage means of the device and automatically transmitted, via the input/output means, to the cloud where it is also stored. Further, the at least one electronic device accesses the data associated to a particular use code and stored in at least one of the cloud and the at least one device by providing the particular use code as access code.

In some examples, the use code is generated by the device, stored in the data storage means of the device and sent, via the input/output means, to the cloud.

In some examples, upon activation of the device, the method comprises sending, by the device and via its input/output means, an alert to the cloud informing of its activation. In response to reception of the alert, the means for generating the use code in the cloud generates the use code that is sent to the device. Alternatively, once the device is active, the method may comprise remotely or locally sending the use code to the device. This use code may be previously generated by a user in an external device having communication subsystems to remotely or locally transmit said use code to the device via its input/output means.

In some examples, the device is reused by being housed in the same or a different container and generating a new use code associated to a new transport stage monitored in the same or a different container, and therefore by the device housed therein, and repeating the steps previously disclosed. Therefore, the data associated to measurements captured during said transport stage are associated to said new use code.

The device, system and method of the disclosure allow to keep the confidentiality of the recorded and transmitted data, in such a way that only the authorized person is allowed to access the data. As a consequence, the fear of unwanted access from third parties to confidential data is no longer an obstacle to the reuse of the recording devices. In addition, the devices can be reused many times since every time the device is reactivated for a new shipping, a new use code is used to associate data measured during said new shipping.

The advantages of the disclosure become apparent in view of the description which is given below.

BRIEF DESCRIPTION OF THE DRAWINGS

In order to complement the description and with the aim of aiding a better understanding of the characteristics of the disclosure, in accordance with a practical exemplary embodiment of the same, a set of figures are attached as an integral part of the description, in which the following is depicted in an illustrative and non-limiting manner.

DETAILED DESCRIPTION OF THE DRAWINGS

The recording system of the disclosure is formed by different physical and logical elements. The main physical element is a monitoring device 10 for recording and locally storing parameters measured inside a container, chamber or box. In some examples, the container may be a temperature-controlled container, a humidity-controlled container, a watertight or airtight container, etc. Containers are usually transported in trucks, aeroplanes, ships, trains, vans or other transport means. For recording parameters relating to the conditions of transport of the goods, for example the temperature inside the container, the device 10 needs to be located in each one of the containers which are sought to be monitored. The recording device 10 can be located in any place in the interior of said container. The device 10 is able to measure temperatures which may vary between −35° C. and 70° C. The device 10 is capable of monitoring at least the temperature inside the temperature-controlled container. The precision of the temperature sensor may be at least 3° C. and preferably about 0.5° C. Other parameters that the device 10 may monitor, depending on the sensors installed thereon, are the relative humidity, the level of one or more gases (such as $CO_2$, ethylene or others) or impacts that the goods transported may have received, amongst others. Based on the parameters to be monitored, the device may comprise light sensors, humidity sensors, accelerometers, gas sensors or any combination thereof. These sensors may be integrated within the monitoring device casing or may be external sensors communicatively coupled to the monitoring device.

The parameter or parameters of interest may be recorded by the device 10 in a continuous manner, that is to say, they are not recorded in an isolated or exceptional manner, but repeated times during the time which the transport of the container lasts. The measurements of each parameter can be taken either periodically or in a non-periodic manner, for example randomly. Depending on the parameter to be measured, the period with which the parameters are gathered and recorded may vary. Besides, the device 10 may be programmed to maintain a constant period for gathering and storing data during the transport of the container or may change the period depending, for example, on the distance covered by the container or the time consumed since the device 10 was activated. In some examples, the measurements may be taken in a periodic manner, for example every 10 or 15 minutes.

In some embodiments, the device 10 has at least one sensor to measure at least one parameter. Examples of sensors may be temperature sensors, light sensors, humidity sensors, accelerometers and gas sensors. Preferably, the device integrates at least one temperature sensor to measure the temperature inside the container. The device also comprises input/output means compatible with any conventional communication interface, such as Bluetooth, RFID, USB, GPS, GPRS, GPRS, 2G, 4G, 5G, LTE, CatM, NB Iot, Sigfox, Lora and other communications protocol standards, preferably in the form of an input/output subsystem, including the corresponding antennas, transceivers, controllers, connectors, ports, etc., to provide the information recorded in the device 10. Optionally, the input/output means can be used to introduce information, such as information to program or configure the device 10, or even a use code generated by a user. The device 10 may transmit the recorded information either periodically, in a non-periodic manner, for example randomly, or when it is in a specific network coverage.

The device 10 also incorporates a battery, preferably non-rechargeable and removable, to power the electronic components within the device 10. The device 10 further comprises storage means, for example any of Random Access Memory (RAM), volatile memory, non-volatile memory, flash memory, a storage drive (e.g., a hard drive), a solid state drive and the like, or a combination thereof, to store the data measured by the sensor(s). The device 10 also comprises processing means, such as a central processing unit (CPU), microprocessor, or any hardware device suitable for performing the functionalities herein described.

The device 10 may comprise electronic means, such a Printed Circuit Board (PCB), on which all the electronic components within the device 10 are attached to. The electronic board may have attached other conventional elements (not described herein) which as an expert understands may be necessary for recording, storing and transmitting the data captured by the sensor.

Figure 1:
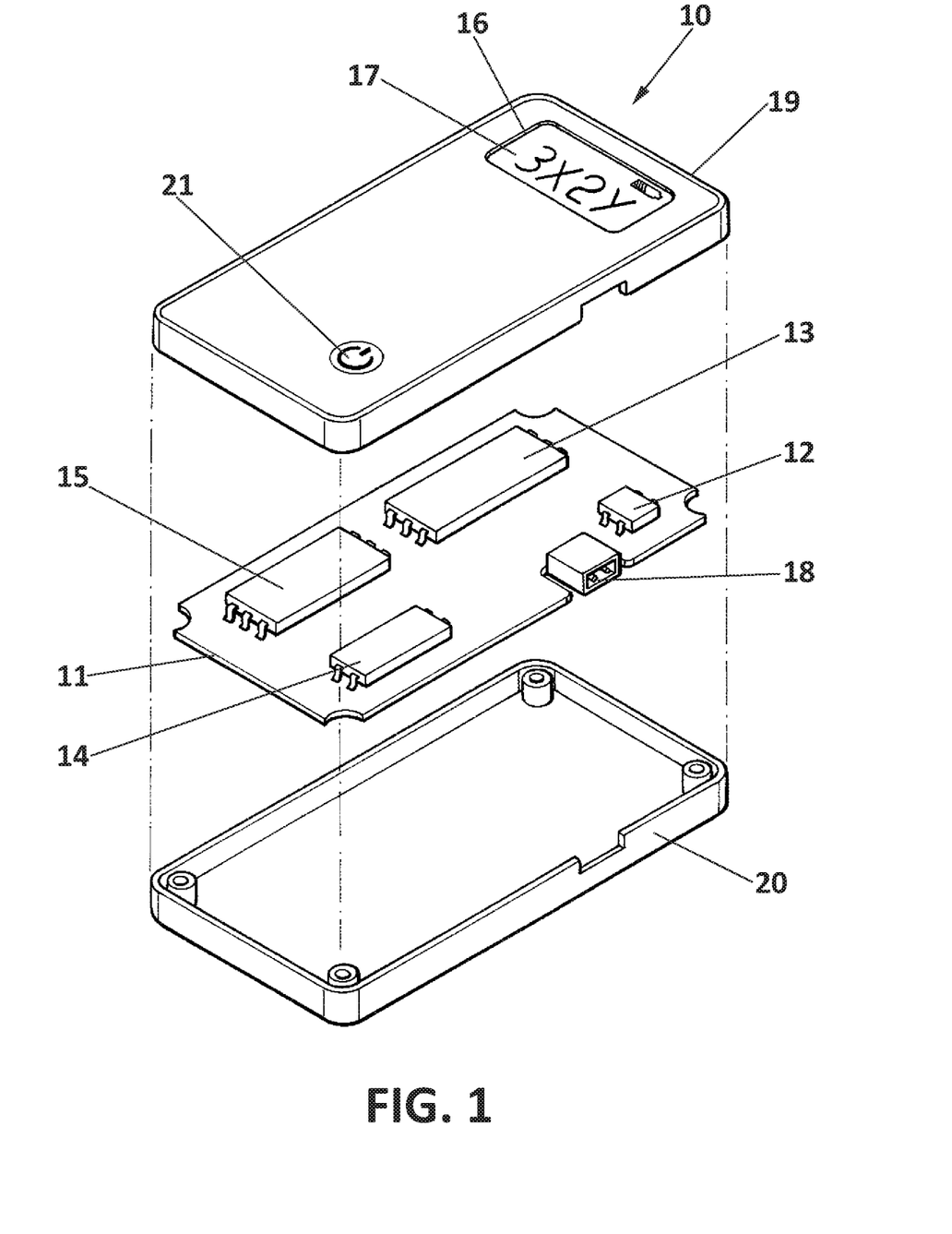
FIG. 1 shows a diagram of the exploded view of a device according to a possible implementation of the disclosure.

Turning now to the figures, FIG. 1 shows an exploded view of a monitoring device 10 according to a possible implementation of the disclosure. The monitoring device 10 of this embodiment incorporates a PCB 11, one temperature sensor 12, such as a Negative Temperature Coefficient (NTC) thermistor, storage means 13, a processor 14 and a GPS module (not shown in this figure) to locate the geographical position of the device at any time. The monitoring device 10 also incorporates other elements which provide the device with optimised features. These additional elements can be (one, various or all of them): a battery (not shown in this figure), a GPRS communication unit 15, a display or screen 16 to display the use code 17; a mini-USB port 18 to locally download data stored in the storage means 13, a case or casing, preferably made of plastic and also preferably in the form of an upper case (upper casing) 19 and a lower case (lower casing) 20 to protect and isolate the PCB from the exterior (dirt, humidity, etc.). The device 10 may further comprise means for generating the use code 17, such as a PRNG or TRNG, or may comprise means, for example the GPRS communication unit 15, the mini-USB port 18 or any other communication systems, for remotely or locally receiving said use code 17 from the cloud or from an external device such a laptop, a tablet, smartphone, etc.

The PCB 11 has an activation/deactivation mechanism (not shown in this figure) to turn on and off the monitoring device 10. This activation/deactivation mechanism is actuated by pressing the on/off button 21 on the upper casing 19. In some examples, instead of having one activation/deactivation button, two different buttons may be used, one for activate, another for deactivate, allowing other options like for example navigating in the screen.

In some examples, instead of having a protective case, the monitoring device 10 has a protective film, preferably made of plastic. While in the implementation of FIG. 1 the at least one sensor is inside the device, thus facilitating the watertightness and reducing the response speed to reach the exact measurement of temperature or other values, in some other examples the at least one sensor may be attached to an external surface of the case to improve data measurement or may be integrated into external probes communicatively coupled to the device 10. The monitoring device 10 has been designed to meet at least IP65, preferably IP67, protection grade of the international standard, IEC 60529 Degrees of Protection against water and dust particles.

While the local connection unit shown in FIG. 1 is a mini-USB port 18, the monitoring device 10 may incorporate other local connection units such as a Wi-Fi module or a combination of both. The monitoring device 10 may also incorporate remote connection units, other than the GPRS communication unit, such as, GSM or Nb-IoT communication units. As used herein, a local connection may refer to a connection that requires the presence of the sending device and the receiving device in proximity. In other words, a local connection is understood to be a connection which is not remote, but both devices are separated at a maximum distance of a number of meters. As used herein, a remote connection may refer to a connection that does not require the presence of the sending device and the receiving device in proximity. The local connection can be wired or wireless while the remote connection is wireless. The local connection is normally activated in the event of failure in the network, in the remote connection or for firmware updating purposes. In some other cases, firmware update can also be done remotely.

The device to which the data are downloaded can be any device which comprises at least data input/output means compatible with the input/output means of the device 10 and storage means (for example, a RAM memory) for storing said information. Non-limiting examples of such a device to which the information stored in the device 10 is downloaded are: portable or desktop computer, PDA, tablet, mobile telephone, smartphone, etc. The device 10 allows the downloading of the individualised and manageable data. The data are preferable binary coded.

The monitoring device 10 has a maximum period of recording imposed by the electronics (e.g. memory capacity). Optionally, a minimum recording time can be imposed. Once the monitoring device 10 is turned on, immediately or after a brief transitory period, the monitoring device 10 starts gathering data, whether periodically or not periodically, according to how it has been programmed.

Figure 2:
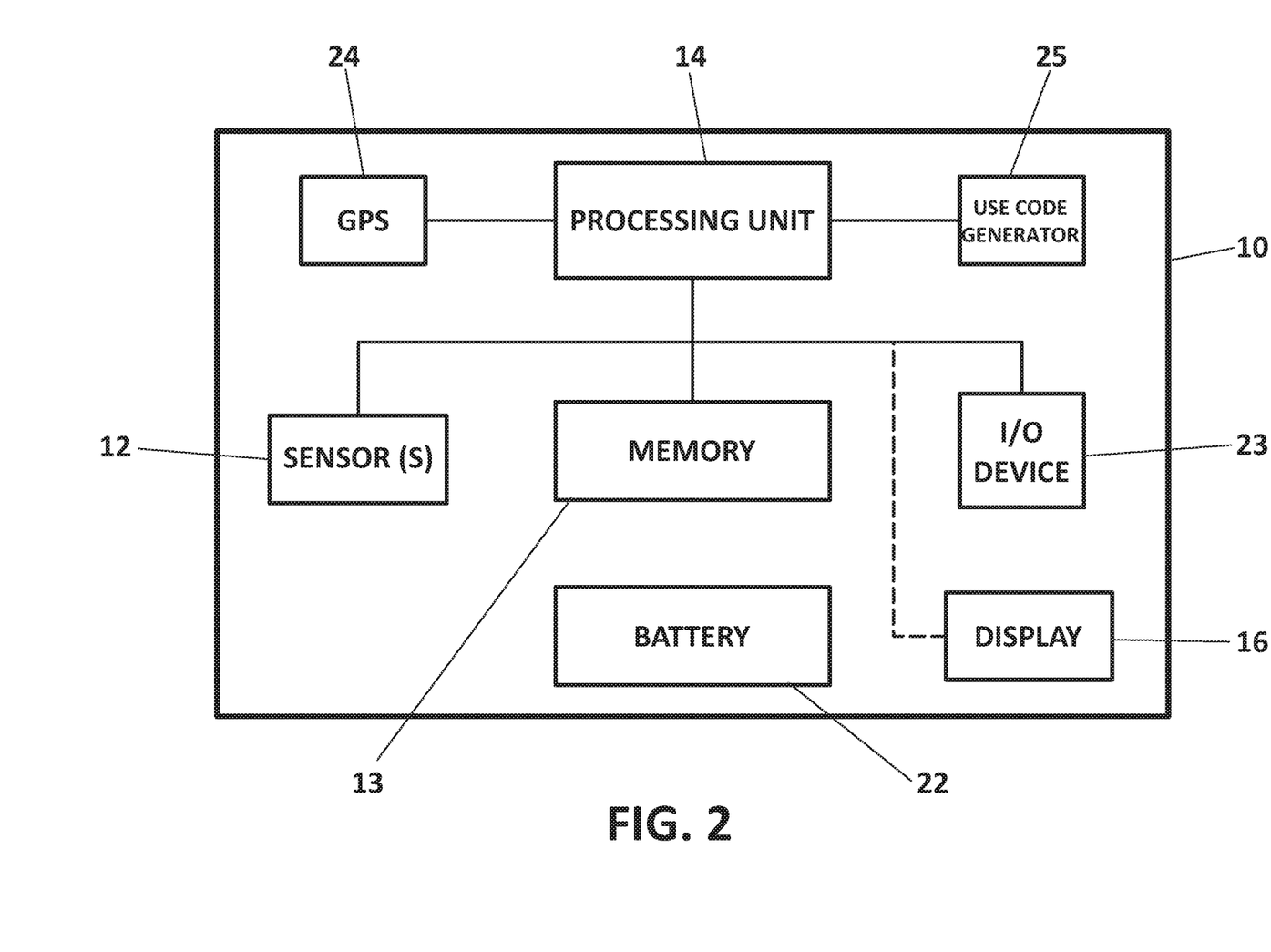
FIG. 2 shows a diagram of the internal architecture of the device according to a possible embodiment of the disclosure.

FIG. 2 shows a diagram of the internal architecture of the monitoring device 10 according to a possible embodiment of the disclosure. The monitoring device 10, that is to be located in the interior of a container for transporting products, comprises at least one sensor 12 to measure the at least one parameter, for example the temperature inside the container, a memory 13 to store the gathered data, a battery 22 to power all the electronic elements within the monitoring device 10 and at least one input/output device 23. The input/output device 23 incorporates the local and remote connections including the mini-USB port 18, the GPRS communication unit 15 and the respective controllers for managing them.

The monitoring device 10 further comprises a processor 14 to associate a particular use code, corresponding to the shipping stage of the container, to the data gathered during operation of the monitoring device 10. This data is gathered by the sensor 12 and the GPS 24. The associated data is accessible for a user when the particular use code associated to this data is provided by said user as a valid access code. In such example, the use code may be generated in the monitoring device 10. The monitoring device 10 may comprise a use code generator module 25, e.g. a PRNG, connected to the processor 13, such that, for example every time the device 10 is turn on (that will correspond with a different transport stage), the use code generator module 25 generates a new use code that the processor 13 associates to the data gathered by the sensor 12 and the GPS 24. This data already associated to the generated use code is stored in the memory 13 and, simultaneously may be transmitted to the cloud by means of the GPRS communication unit 15. In this way, the information gathered by the monitoring device 10 is available for an authorized user in a local and remote manner. In general, there will be a different use code for each shipping stage in which the same monitoring device 10 may be involved.

Figure 3:
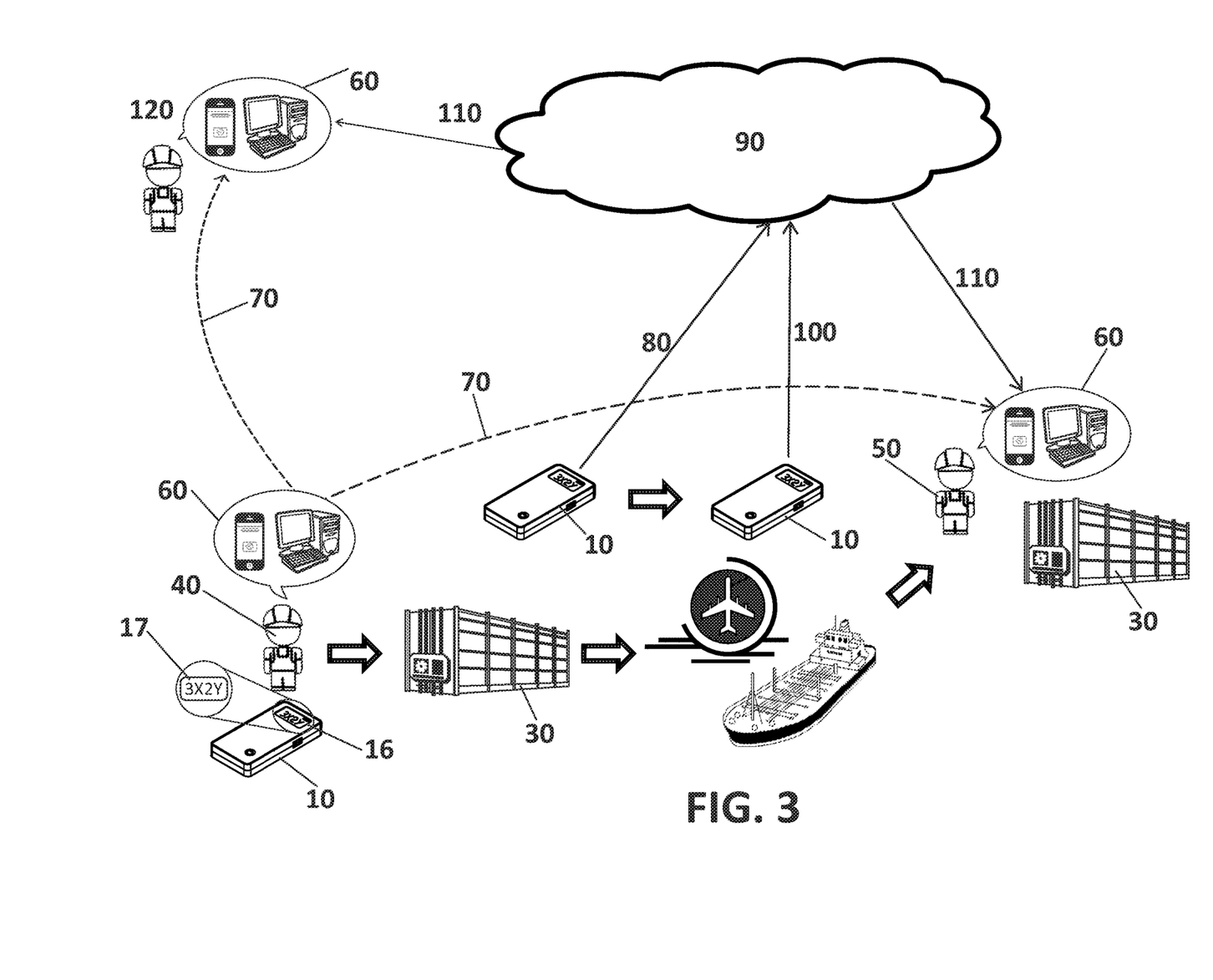
FIG. 3 shows a diagram of the architecture of the recording system according to an embodiment of the disclosure.

FIG. 3 shows a diagram of the architecture of the recording system according to an embodiment of the disclosure. The products travel in the container 30, the parameters of which products are sought to be monitored. The device 10 is activated and a use code 17 is generated for that particular transport stage. The use code 17 will be in general different from any other use code associated to other transport stages involving the same device 10. This use code 17, that has been generated in the device 10, is shown in the display 16 so that the user 40 located at the departure location can see it and send it 70 to the user 50 located at the destination location. For example, user 40 may send 70 an email or message to user 50 using respective electronic devices 60 such as PCs, smartphones or PDAs. The use code 17 is also sent 80 by the GPRS communication module 15 to the cloud 90 from where it is also retrievable by user 50 by using the use code 17 received from user 40. Once activated, the device 10 is placed inside the container 30 during the transport stage of the same, whether inside a box of the cargo or outside. Once the device 10 is activated and after a brief transitory period, the device 10 begins to gather environmental information, such as the temperature inside the container 30. The data gathering may be performed at any rate depending on how the processor 13 that manages the sensor 12 and the GPS 24 has been programmed. The use code 17 remains associated to the shipping of the cargo until the container 30 arrives to its destination and the device 10 is deactivated by user 50.

Alternatively, the use code 17 can be generated directly in the cloud 90 and sent to the device 10. If the device has a display 16, the use code 17 can be displayed to the user 40 who may send it to user 50. On the contrary, in implementations lacking the display 16, the user 50 may directly retrieve the use code 17 from the cloud 90.

The data gathered is associated to the use code 17 and stored in the memory 13 of the device 10. The device 10, by means of its GPRS connection module 15, sends 100 the associated data to the cloud 90 where it is stored. For example, the sensors of the device 10 may sense and store data at a particular rate, e.g. every minute, but may send the gathered data already associated to the corresponding use code 17 at a different rate, e.g. every ten minutes, to optimize resources, in particular battery. This information is stored both in the device 10 and in the cloud 90, unless the user 40 provides the code or the user 50 downloads it from the cloud as an authorized user.

Alternatively, the user 50, instead of receiving the use code 17 from the user 40 or getting it from the cloud 90, may get it from the display 16 of the device when the container 30 has arrived to its destination. In another alternative, user 40 may generate the use code 17 for a specific transport stage in a device different from the device 10 or the cloud 90, such that this use code 17 could be printed in a sticker and attached to the device 10 before the transport is carried out.

At the arrival of the container 30 to the destination, user 50 accesses to the cloud 90 and downloads 110 the data gathered during the transport stage of the container 30 by using the corresponding use code 17 as a valid access code. Alternatively, upon arrival of the container 30 at the destination and before removing the cargo from the container 30, in the event of failure in the network or in the remote connection user 50 removes the device 10 to proceed with the downloading of the data recorded during the entire journey. The user 50, when accessing the device 10 that travels within the container 30, carries an electronic device 60, for example a laptop. The electronic device 50 can be for example a portable or desktop computer, a PDA, a tablet, a mobile telephone, a smartphone, a portable reader device or any electronic device which comprises a memory and a processor. By means of the mini-USB port 18 of the device 10, a connection is established with a corresponding port of the electronic device 60. The connection between the device 10 and the electronic device 60 may established by means of any other conventional data transmission system or technology, whether wireless (for example Bluetooth, Wi-Fi, RFID, etc.) or wired (USB, micro USB or any other conventional interface). The device 10 transmits the data associated to the shipping to the electronic device 60 when the user 50 provides identification of the corresponding use code 17 to the device 10. The information (data) relating to the measurements of one or more parameters taken at different moments in time during the journey travelled by the container 30, is downloaded by the user 50 in their conventional electronic device 60 thanks to a specific software for such purpose.

In an alternative embodiment, the user 50 access the recording device 10 associated with the container 30 being located in the vicinity of said container 30, for example accessing from a warehouse or from the port. Thus, when the electronic device 60 detects the recording device 10 in its wireless coverage area (for example, Wi-Fi), it automatically accesses the device 10 by providing the use code corresponding to that shipping of the container 30 to download the data from the same to.

In addition, another user 120 not having direct access to the device 10 located within the container 30, may receive 70 the use code 17 from the user 40 located at the departure location (alternatively the use code 17 may be received from user 50 or from any other user or system having access to that particular use code 17), for example via an email or message using respective electronic devices 60 such as PCs, smartphones or PDAs. Then user 120 accesses to the cloud 90 and downloads 110 the data gathered during the transport stage of the container 30 by using the corresponding use code 17 as a valid access code. From the moment in which any data gathered during the transport stage of the container 30 is uploaded to the cloud 90, said data becomes remotely accessible only for those users having the use code.

In such implementation, data retrieved from the cloud or the device by user 50 relate mainly to the series of temperature/time which has been produced during the transport and which are contrasted with the temperature which the products should have theoretically maintained in the cold chain. Although in FIG. 3 a single container 30 including a single device 10 is depicted, a single container with a plurality of devices to measure different parameters or to measure the same parameter in order to double check data measurements by the user at the destination may be implemented.

Besides, once user 50 has accessed to the gathered data 110 subsets of data of interest may be selected in order to compare them, combine them and/or draw conclusions with respect to one or more parameters selected by the user himself, and manage them by means of creating alarms and/or filters associated with one or more containers.

In this text, the word "comprises" and its variants (such as "comprising", etc.) are not to be interpreted in an exclusionary manner, that is to say, they do not exclude the possibility that what is described includes other elements, steps etc.

In the context of the present disclosure, the term "approximately" and the terms in its family (such as "approximate", etc.) are to be understood as indicative values which are very close to those which accompany the previously mentioned term. That is to say, a deviation within the acceptable limits based on an exact value should be accepted since the person skilled in the art understands that said deviation based on the indicated values is inevitable due to the imprecisions of the measurement, etc. The same applies to the terms "around" and "substantially".

In addition, the disclosure is not limited to the specific embodiments which have been described, but also covers, for example the variants which can be realised by the person skilled in the art (for example, in terms of the selection of materials, dimensions, components, configuration, etc.), within the scope of what can be deduced from the claims.

The invention claimed is:

1. A device for sensing and recording data associated to at least one parameter associated with the transport of products in a container, the device comprising:
    at least one sensor to measure the at least one parameter;
    positioning means for determining a location of the device;
    data storage means to store data measured by the at least one sensor, the data being associated to the location of the device at the moment in which a particular data is measured;
    input/output means to transmit the data stored in the data storage means;
    generation means for generating random single use codes, wherein generating random single use codes comprises generating one random single use code every time the device is activated;
    processing means to, for each transport stage followed by the device that corresponds to a period of time between an activation of the device and its subsequent deactivation, associate a first random single use code of the random single use codes generated by the generation means to the data collected and stored in the data storage means during the period of time said transport stage lasts, wherein the random single use codes generated every time the device is activated are associated to respective transport stages and are different from each other; and
    wherein the data associated to the first random single use code is accessible for a user having the first random single use code, when the first random single use code is provided by the user as an access code.

2. The device of claim 1, wherein the input/output means are configured to send the first random single use code to the cloud.

3. The device of claim 1, comprising means for receiving, via the input/output means, the first random single use code from:
    the cloud, the first random single use code being received in response to the activation of the device, or
    an external device, the first random single use code being generated by a user and received once the device is activated.

4. The device of claim 1, wherein the device has associated an identifier for unequivocally identifying the device, said identifier being different from any of the random single use codes generated by the generation means.

5. The device of claim 1, wherein said at least one sensor is selected from a group comprising: a temperature sensor, a light sensor, a humidity sensor, an accelerometer a gas sensor, and any combination thereof.

6. The device of claim 1, wherein said input/output means are configured to transmit the data associated to the first single random use code to an external device via a local connection or to transmit said data associated to the first single random use code to the cloud via a remote connection.

7. The device of claim 1, wherein the positioning means are selected from a group comprising a GPS module, a signal triangulation system, and a combination thereof.

8. A system for recording and managing at least one parameter associated with the transport of products in a container, the system comprising:
    at least one device according to claim 1, the at least one device being housed inside the container, wherein, with the at least one device in operation, the first random single use code is associated to the data gathered by the at least one sensor and the positioning system during the time the first transport stage of the container lasts;
    a cloud server to receive and store the data associated to the first random single use code; and
    at least one electronic device configured to enroll as an authorized user for accessing data associated to the first random single use code from at least one of the at least one device and the cloud server when providing the first random single use code as an access code to the respective at least one device and the cloud server.

9. The system according to claim 8, wherein said at least one electronic device is configured to receive the data and the first random single use code delivered by the input/output means of the at least one device by means of a local connection established between the electronic device and the input/output port of the device, said local connection being selected among a wireless connection, or a wired connection.

10. The system according to claim 8, wherein the remote device provides the measured data to the user identifying the first random single use code by way of a web page or a computer application downloaded in at least one electronic device of said user having an internet connection.

11. A computer-implemented method for sensing and recording data associated to at least one parameter associated with the transport of products in a container, the container housing at least one device according to claim 1, wherein during the time said transport lasts, the method includes the following steps:

measuring, by the at least one sensor, a particular parameter at repeated instances during the transport of the container;
determining, by the positioning means, a location of the device at the repeated instances;
generating, by the generation means, random single use codes, wherein generating random single use codes comprises generating one random single use code;
for each transport stage followed by the device that corresponds to a period of time between an activation of the device and a subsequent deactivation of the device, associating the measured data during the period of time a first transport stage lasts to the corresponding locations and to the first random single use code, wherein the random single use codes generated every time the device is activated are associated to each transport stage respectively and are different from each other;
storing the associated data into the data storage means of the device;
automatically transmitting, via the input/output means, the associated data to a cloud server;
storing the associated data into the cloud server; and
accessing, by at least one electronic device, the associated data stored in at least one of the cloud server and the at least one device by providing the first random single use code as the access code.

12. The method according to claim 11, including the following steps:
storing the first random single use code in the data storage means; and
sending, via the input/output means, the first random single use code to the cloud server.

13. The method according to claim 11, wherein upon activation of the at least one device, the method including the following steps:
sending, by the at least one device and via the input/output means, an alert to the cloud server informing of the activation of the at least one device;
in response to reception of the alert, generating, by the cloud server, the first random single use code; and
sending, by the cloud server, the first random single use code to the at least one device.

14. The method according to claim 11, further comprising reusing the at least one device comprising:
at least one sensor to measure the at least one parameter;
positioning means for determining a location of the device;
data storage means to store data measured by the at least one sensor, the data being associated to the location of the device at the moment in which a particular data is measured;
input/output means to transmit the data stored in the data storage means;
generation means, to generate random single use codes, wherein generating random single use codes comprises generating one random single use code;
processing means to, for each transport stage followed by the device, associate the first random single use code to data stored in the data storage means during the time the first transport stage lasts, the first random single use code being associated to the first transport stage, such that the random single use codes generated every time the device is activated are associated to each transport stage respectively and are different from each other;
and wherein the data associated to a first random single use code is accessible for a user having the first random single use code, when the first random single use code is provided by the user as an access code,
by housing the at least one device inside a container and generating a second single random use code associated to a second transport stage to be covered by the container and the at least one device being housed therein, and repeating the method steps, wherein the data measured during the second transport stage is associated to said second random single use code.

* * * * *